Aug. 17, 1926.
C. L. McKELVIE
1,596,111
CULTIVATOR FENDER REGULATOR
Filed August 30, 1924
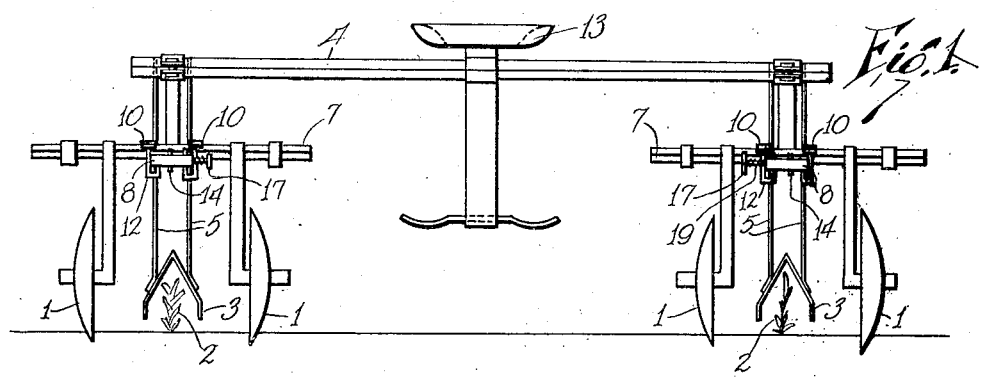
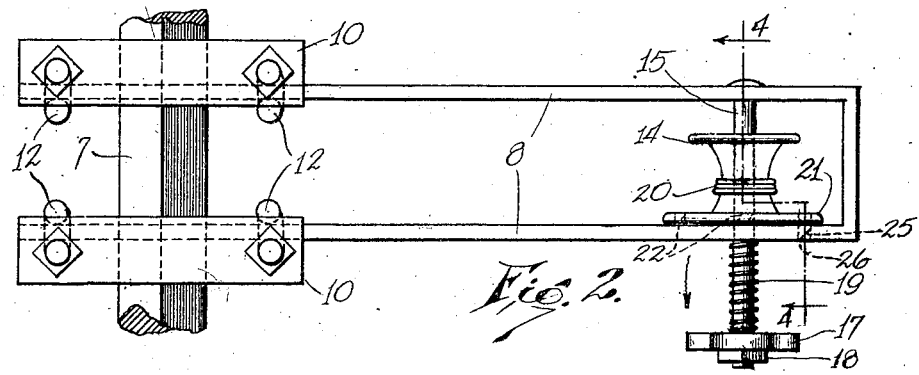
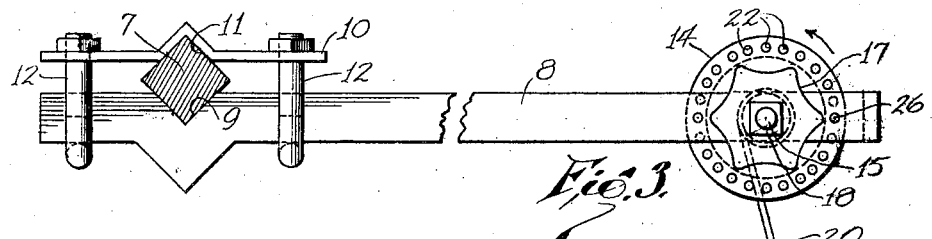
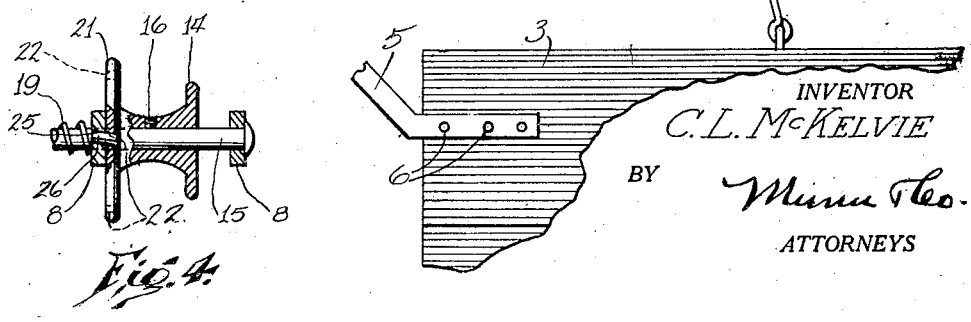
INVENTOR
C. L. McKELVIE
BY
ATTORNEYS Patented Aug. 17, 1926.

1,596,111

UNITED STATES PATENT OFFICE.

CARL L. McKELVIE, OF CLAY CENTER, NEBRASKA.

CULTIVATOR-FENDER REGULATOR.

Application filed August 30, 1924. Serial No. 735,129.

My invention relates to improvements in cultivator fender regulators, and it consists in the combinations, constructions, and arrangements herein described and claimed.

An object of my invention is to provide a cultivator fender regulator which can be adjusted to various heights at the will of the operator, and be locked in adjusted position.

A further object of my invention is to provide a device of the type described in which the device is placed near to the operator so as to permit the operator to adjust the device while still operating the cultivator.

A further object of my invention is to provide a device of the type described which is simple in construction, durable, and efficient for the purpose intended, and which is not likely to get out of order easily.

Other objects and advantages will appear in the following specification, and the novel features of the invention will be particularly pointed out in the appended claims.

My invention is illustrated in the accompanying drawings, forming a part of this application, in which—

Figure 1 is a rear elevation of the device as shown operatively applied to the cultivator, Figure 2 is a plan view of a portion of the device, Figure 3 is a side elevation of Figure 2, and Figure 4 is a section along the line 4—4 of Figure 2.

In carrying out my invention I make use of what is commonly known as the two-row lister cultivator. This cultivator is provided with discs 1 which are adapted to dig on each side of a row of plants, such as that shown diagrammatically at 2. The standard type of cultivator is provided with a fender 3 which is disposed between the discs 1 and above the row of plants 2. This fender shields the plants and prevents the dirt thrown up by the discs 1 from covering the plants. The fenders 3 are pivotally secured to the tongues of the device 4 by means of braces 5. The braces are secured to the fenders 3 by means of rivets 6 or the like (see Fig. 3). The free ends of the braces are secured to the frame in such a manner as to support the fenders 3 and at the same time to permit the fenders to be raised or lowered so as to position the fenders the required distance above the tops of the plants. The means for raising and lowering the fenders usually consisted of the chain which was secured to the outer end of the fenders 3 and was also secured to the bar 7 of the frame 4. This chain when raised or lowered moved the fender anywhere from one to three inches. I have found that much better results can be obtained by raising the fender so as to just clear the tops of the plants, than can be obtained if the fenders are raised from one to three inches above the tops of the plants.

To this end I provide a novel fender regulating means which comprises a U-shaped frame 8 that has an angularly-shaped depression 9 in the upper surface of each of its legs. The depression 9 is adapted to receive the bar 7 so as to cause the walls of the depression to bear against the sides of the bar 7 and thus hold the frame 8 from swinging about the bar 7 as a pivot. The frame 8 is locked to the bar 7 by means of a clamp 10 that also is provided with a depression 11 similar to the depression 9. Hook bolts 12 secure the clamp 10 to the frame 8 and lock the frame to the bar 7. There are two clamps 10 provided, one for each leg of the frame.

In Figure 1 I have shown the cultivator as being provided with two sets of discs 1 and with two fenders 3. It is obvious that the frame 8 and the mechanism hereinafter described may be used for a cultivator having one fender instead of the two shown. In Figure 1, therefore, I have shown two frames 8 which are identical to the frame 8 shown in Figures 2 and 3. The driver's seat 13 is disposed beween the sets of discs 1 and permits the driver to reach either of the frames 8 from where he is sitting. The seat and the frame 4 are shown diagrammatically and are merely for the purpose of showing how the fenders 3 are connected to the frame 4.

Means for raising and lowering the fender 3 comprises a reel 14 that is mounted upon a bolt 15 which in turn is carried by the frame 8. The reel is locked to the bolt 15 by means of a set screw 16 (see Figure 4). A handle 17 of the shape shown in Figure 3 is mounted on the free end of the bolt 15 and is locked in place by means of a nut 18. A spring 19 is disposed between the handle 17 and the frame 8 and tends to move the handle in the direction shown by the arrow in Figure 2. A cable 20 is secured to the reel 14 and to the fender 3 and is adapted to raise or lower the fender with respect to the ground when the reel 14 is rotated. In Figure 3 I have shown the flange 21 of the reel 14 as being provided with a number of openings 22. These openings are inclined at an angle of approximately five degrees with respect to the side of the reel (see Figure 4). The frame 8 is also provided with an opening 25 which is inclined at the same angle as the openings 22, which receives a pin 26. In the present form of the device I have shown the flange 21 as being provided with twenty-four openings. It is obvious that this number may be changed at will. The openings 22 are shaped so as to permit the pin 26 to enter any one of these openings.

From the foregoing description of the various parts of the device, the operation thereof may be readily understood. The bolts 15 in the two frames 8 shown in Figure 1 are positioned so as to dispose the handle 17 adjacent to the driver. The handles 17 are close enough for the driver to grasp while still seated, and therefore it will be seen that the driver may raise or lower the fenders 3 while still operating the cultivator. If the operator desires to raise the fenders 3, he merely presses inwardly upon the handles 17, thus compressing the spring 19 and moving the flange 21 so as to free the pin 26 from the opening 22 in which it has been disposed. The handle 17 may now be rotated as much as desired so as to wind the cable 20 upon the reel 14. As the cable is wound upon the reel 14, it will raise the fender 3 to the desired position. The openings 22 are disposed close enough together so as to permit a very fine adjustment of the fenders 3. The fender 3 is raised approximately one-fourth inch when the handle 17 is rotated so as to dispose the pin in the next succeeding opening 22. This is a distinct advantage over the raising mechanism now provided on the standard cultivators. It will therefore be seen that the operator may adjust the fender 3 so as to have the top of the fender just clear the top of the plant 2 and thus cause the sides of the fender to protect the entire plant from the dirt which is thrown up by the discs 1. As heretofore stated, the device may be quickly attached to the standard cultivator without any alterations being necessary in the latter. The frames 8 are secured to the bar 7 by means of the clamps 10 and the cables 20 may be quickly secured to the fenders 3. The device is now ready for operation.

The angle of the pin 26 is such as to prevent the accidental release of the wheel 14 from the pin. As shown in Figure 2 the spring 19 tends to move the reel 14 in the direction of the arrow and therefore causes the flange 21 to frictionally engage with the inner surface of the frame 8. The spring therefore tends to keep the flange 21 in engagement with the pin 26. The angle of the pin and the angle of the openings 22 cause the pin to bear against the wall of the opening in which it is disposed, and therefore make it practically impossible for the flange 21 to become accidentally disengaged from the pin 26. This friction, however, is not great enough to prevent the operator from moving the handle 17 in a direction reverse to that shown by the arrow in Figure 2, so as to free the flange 21 from the pin 26. The pin 26 acts as a cam surface for the wall of the opening 22. It will be noted that the pin is disposed on the right hand side of the reel shown in Figure 3 and that the cable 20 pulls upon the reel, tending to rotate the reel in the direction of the arrow in Figure 3. The pin 26 is slanting downwardly and therefore the pull of the cable upon the reel causes the pin 26 to be cammed into the opening 22. This provides a novel lock which does not interfere in any way with the normal operation of the reel.

It is to be noted that the gangs which comprise the discs 1 and bar 7 are pivotally secured to the frame 4 and are therefore adjustable to rows of various widths.

I claim:—

1. In a device of the type described, consisting of a frame, a shaft carried by said frame, a reel secured to said shaft and having a plurality of radially spaced openings, the openings being spaced close together, and means carried by said frame for entering any one of said openings so as to prevent the rotation of the reel in one direction, spring means for yieldingly holding said reel in engagement with said means, said reel when rotated in one direction being freed from said means, and when moved away from said means being rotatable in either direction.

2. In a device of the type described, consisting of a frame, a shaft carried by said frame, a reel secured to said shaft and adapted to be rotated so as to wind a cable thereon, said reel having openings disposed adjacent to the periphery of the reel and close to each other, a projection carried by said frame and extending at an angle so as to enter any one of said openings and to prevent the rotation of the reel in a direction to unwind the cable therefrom, spring means for yieldingly holding said reel in engagement with said projection, said reel being released from said projection when rotated in one direction, and being rotatable in either direction when moved away from said projection.

CARL L. McKELVIE.